(12) United States Patent
Park et al.

(10) Patent No.: US 10,261,356 B2
(45) Date of Patent: Apr. 16, 2019

(54) LIQUID CRYSTAL DISPLAY DEVICE AND METHOD OF MANUFACTURING THE SAME

(71) Applicant: SAMSUNG DISPLAY CO., LTD., Yongin, Gyeonggi-do (KR)

(72) Inventors: Min Wook Park, Cheonan-si (KR); Jeong Man Son, Suwon-si (KR); Jin Young Lee, Suwon-si (KR); Deok Ho Kang, Seoul (KR); Jong Keun Kim, Seoul (KR); Dong Hee Ye, Daegu (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 192 days.

(21) Appl. No.: 15/095,218

(22) Filed: Apr. 11, 2016

(65) Prior Publication Data
US 2017/0017109 A1    Jan. 19, 2017

(30) Foreign Application Priority Data

Jul. 14, 2015  (KR) .................. 10-2015-0099490

(51) Int. Cl.
G02F 1/1335 (2006.01)
G02F 1/1337 (2006.01)
G02F 1/1339 (2006.01)

(52) U.S. Cl.
CPC ...... *G02F 1/133512* (2013.01); *G02F 1/1337* (2013.01); *G02F 1/1339* (2013.01); *G02F 1/13394* (2013.01)

(58) Field of Classification Search
CPC .................. G02F 1/133512; G02F 1/1339

USPC ......................................... 349/110
See application file for complete search history.

(56) References Cited

U.S. PATENT DOCUMENTS

| 5,317,434 A | * | 5/1994 | Ohara | G02F 1/1337 349/106 |
|---|---|---|---|---|
| 2007/0291216 A1 | * | 12/2007 | Chan | G02F 1/1339 349/153 |
| 2014/0210033 A1 | * | 7/2014 | Yano | H01L 27/14621 257/432 |
| 2015/0118603 A1 | * | 4/2015 | Hong | G03F 7/30 430/5 |
| 2016/0103345 A1 | * | 4/2016 | Lee | G02F 1/133351 349/110 |
| 2017/0052405 A1 | * | 2/2017 | Yu | G02F 1/133512 |

FOREIGN PATENT DOCUMENTS

| JP | 2015040879 A | 3/2015 |
|---|---|---|
| KR | 100982499 B1 | 9/2010 |
| KR | 1020120042149 A | 5/2012 |
| KR | 1020130003056 A | 1/2013 |
| KR | 1020130130483 A | 12/2013 |
| KR | 101408257 B1 | 6/2014 |
| KR | 101426141 B1 | 7/2014 |
| KR | 1020140130224 A | 11/2014 |
| KR | 1020140148377 A | 12/2014 |

\* cited by examiner

*Primary Examiner* — Lucy P Chien
(74) *Attorney, Agent, or Firm* — Cantor Colburn LLP

(57) ABSTRACT

A liquid crystal display device includes a first substrate and a second substrate facing each other, a liquid crystal layer disposed between the first substrate and the second substrate, and a light shielding pattern disposed on the first substrate, where the light shielding pattern includes an open portion defined in a non-display area, and the open portion is defined in the light shielding pattern.

17 Claims, 20 Drawing Sheets

LIQUID CRYSTAL DISPLAY DEVICE AND METHOD OF MANUFACTURING THE SAME

This application claims priority to Korean Patent Application No. 10-2015-0099490 filed on Jul. 14, 2015, and all the benefits accruing therefrom under 35 U.S.C. 119, the content of which in its entirety is herein incorporated by reference.

BACKGROUND

1. Field

Exemplary embodiments of the invention relate to a liquid crystal display device and a method of manufacturing the liquid crystal display device.

2. Description of the Related Art

Generally, a liquid crystal display ("LCD") device includes a display area on which a plurality of pixels is arranged to display an image and a non-display area on which a drive circuit and the like are arranged in a peripheral portion of the display area. In recent years, a demand for a narrow bezel to minimize the non-display area of the LCD device has been increasing. As the non-display area becomes narrower when implementing a narrow bezel, an alignment layer may overflow the panel and invade a short point for applying a common voltage to the common electrode. When the alignment layer invades a short point region, a short circuit failure may occur.

In order to prevent the short circuit failure, a method of forming a dam structure capable of preventing the spreading of the alignment layer may be taken into consideration.

SUMMARY

In order to form a dam structure, it is inevitable to use a new mask in a manufacturing process, which may result in an increase in costs and complexity of the process.

Exemplary embodiments of the invention provide a method of manufacturing a liquid crystal display ("LCD") device to have a structure for preventing the spreading of an alignment layer without an additional mask process.

Exemplary embodiments of the invention also provide an LCD device having a structure for preventing the spreading of an alignment layer.

By using a method of manufacturing an LCD device according to an exemplary embodiment of the invention, it is possible to manufacture an LCD device having a structure for preventing the spreading of an alignment layer without an additional mask process.

Further, an LCD device according to an exemplary embodiment of the invention includes a structure for preventing an alignment layer from flowing to a short point, which may be advantageous in implementing a narrow bezel.

The effects of the invention are not limited to the above-described effects and other effects which are not described herein will become apparent to those skilled in the art from the following description.

According to an exemplary embodiment of the invention, an LCD device includes a first substrate and a second substrate facing each other, a liquid crystal layer disposed between the first substrate and the second substrate, and a light shielding pattern disposed on the first substrate, where an open portion is defined in the light shielding pattern in a non-display area.

In an exemplary embodiment, the LCD device may further include an alignment layer disposed on one surface of the first substrate facing the liquid crystal layer, where a portion of the alignment layer is disposed in the open portion.

In an exemplary embodiment, the LCD device may further include an alignment layer disposed on one surface of the first substrate facing the liquid crystal layer, and a sealing member disposed on the non-display area to bond the first substrate with the second substrate, where the alignment layer contacts the sealing member.

In an exemplary embodiment, the LCD device may further include a common electrode disposed on the second substrate, and a common voltage line disposed on the non-display area on the first substrate, where the open portion is disposed more inward on the first substrate than a short point at which the common electrode and the common voltage line are electrically connected to each other.

In an exemplary embodiment, the LCD device may further include a light shielding colored layer disposed on the first substrate below the light shielding pattern, where the light shielding colored layer is disposed to correspond to the open portion.

In an exemplary embodiment, the light shielding colored layer may be blue.

In an exemplary embodiment, the light shielding colored layer may include a first light shielding colored layer and a second light shielding colored layer which are stacked sequentially, and the first light shielding colored layer and the second light shielding colored layer have different colors from each other.

In an exemplary embodiment, one of the first light shielding colored layer and the second light shielding colored layer may be blue and the other one may be red.

In an exemplary embodiment, the LCD device may further include an organic layer disposed on the first substrate below the light shielding pattern, where the organic layer includes a stepped portion corresponding to the open portion.

In an exemplary embodiment, the LCD device may further include an alignment layer disposed on one surface of the first substrate facing the liquid crystal layer, where a portion of the alignment layer is disposed in the stepped portion.

In an exemplary embodiment, the LCD device may further include a light shielding metal layer disposed on the first substrate below the light shielding pattern, where the light shielding metal layer is disposed to correspond to the open portion.

In an exemplary embodiment, the LCD device may further include a column spacer disposed on the first substrate to maintain a distance between the first substrate and the second substrate, where the light shielding pattern and the column spacer are unitary with each other.

According to another exemplary embodiment of the invention, a method of manufacturing an LCD device includes forming a light shielding pattern on a first substrate including a display area and a non-display area, and forming an alignment layer on the light shielding pattern, where the open portion is defined in the light shielding pattern.

In an exemplary embodiment, a portion of the alignment layer may be disposed in the open portion.

In an exemplary embodiment, the method may further include forming a light shielding colored layer on the first substrate below the light shielding pattern, where the light shielding colored layer corresponds to the open portion.

In an exemplary embodiment, the light shielding colored layer may include a first light shielding colored layer and a second light shielding colored layer which are stacked sequentially, and the first light shielding colored layer and the second light shielding colored layer have different colors from each other.

In an exemplary embodiment, the method may further include forming an organic layer on the first substrate below the light shielding pattern, where the organic layer includes a stepped portion corresponding to the open portion.

In an exemplary embodiment, a portion of the alignment layer may be disposed in the stepped portion In an exemplary embodiment, the method may further include forming a light shielding metal layer on the first substrate below the light shielding pattern, where the light shielding metal layer is disposed to correspond to the open portion.

In an exemplary embodiment, the method may further include forming a column spacer on the first substrate to maintain a distance between the first substrate and the second substrate, where the light shielding pattern and the column spacer are simultaneously and unitarily formed.

BRIEF DESCRIPTION OF THE DRAWINGS

The above and other exemplary embodiments and features of the invention will become more apparent by describing in detail exemplary embodiments thereof with reference to the attached drawings, in which.

DETAILED DESCRIPTION

Figure 1:
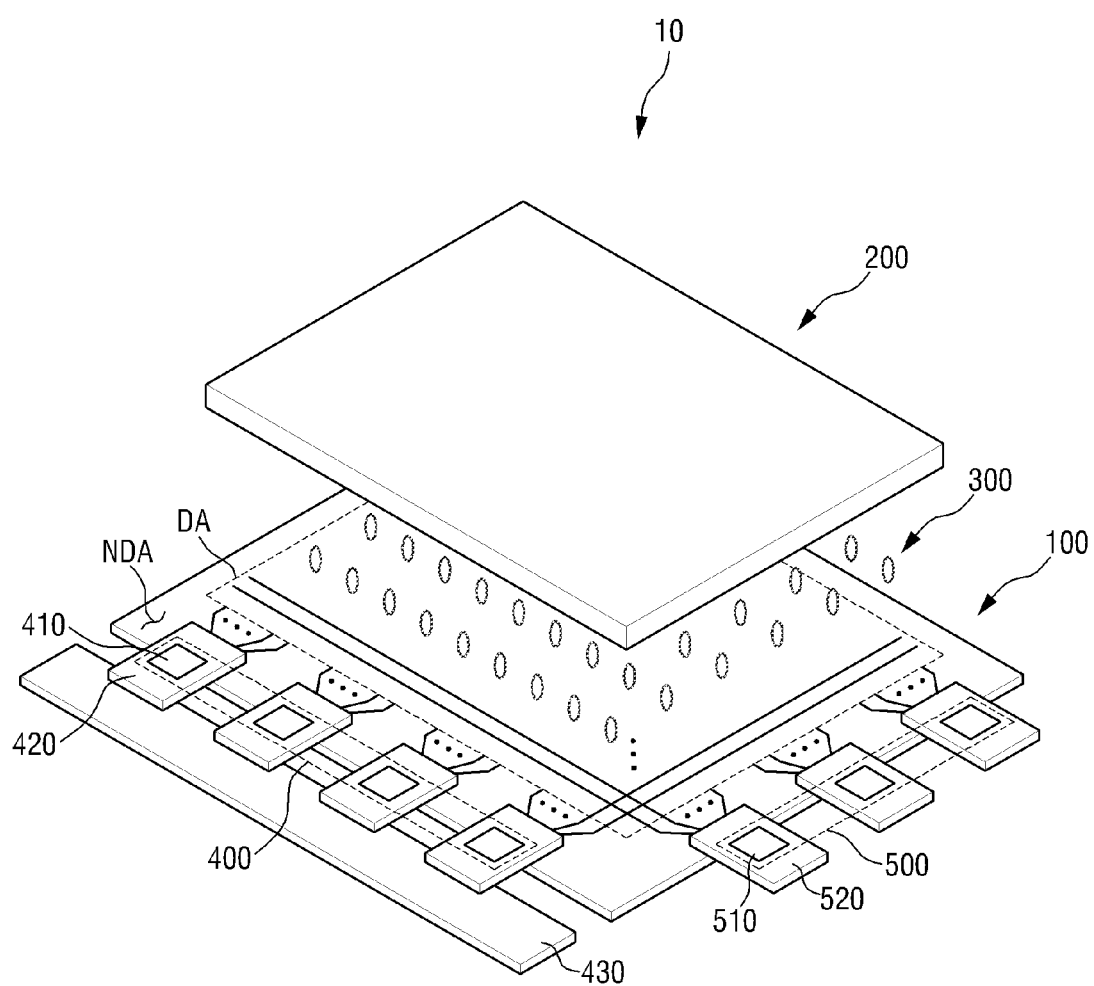
FIG. 1 is a schematic exploded perspective view illustrating an exemplary embodiment of a liquid crystal display ("LCD") device according to the invention.

Reference will now be made in detail to exemplary embodiments, examples of which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain exemplary embodiments of the description.

The description that one element is connected to or coupled to another element includes both a case where the one element is directly connected to the another element or a case where further another element is interposed between the elements. However, the description that one element is directly connected or directly coupled to another element indicates that there is no further another element between the elements. The term "and/or" includes any and all combinations of one or more of the associated listed items.

A singular expression in the specification also includes a plural expression. The terms "comprise" and/or "comprising" do not exclude the possibility of existence or addition of one or more other components, steps, operations, and/or devices.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, exemplary embodiments of the invention will be described with reference to the drawings.

Figure 2:
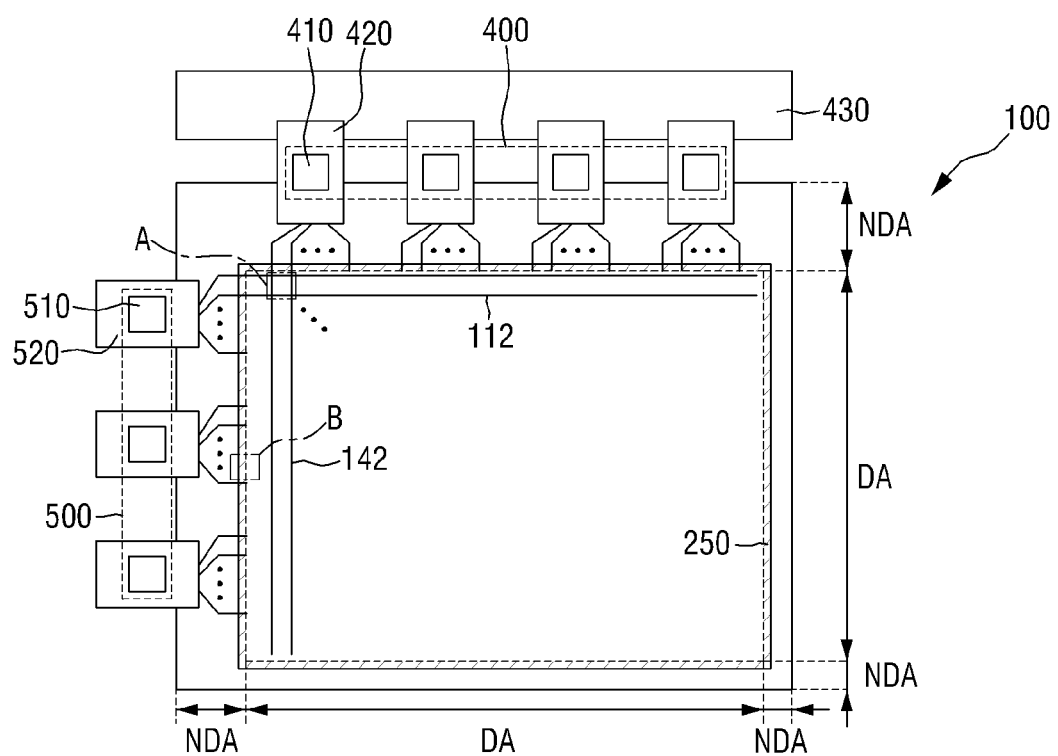
FIG. 2 is a plan view of the exemplary embodiment of a first display substrate of the LCD device according to the invention.
Figure 3:
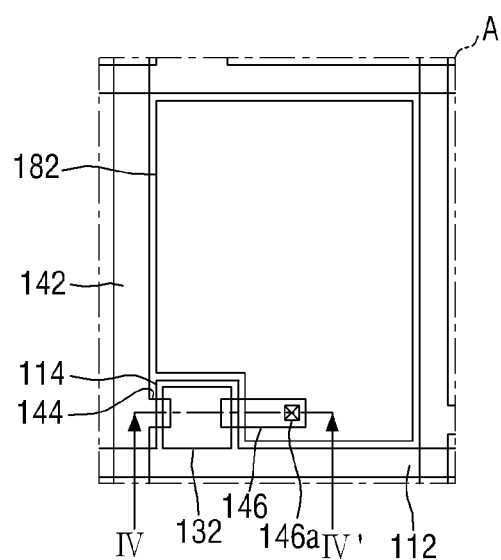
FIG. 3 is an enlarged view of region A of FIG. 2.
Figure 4:
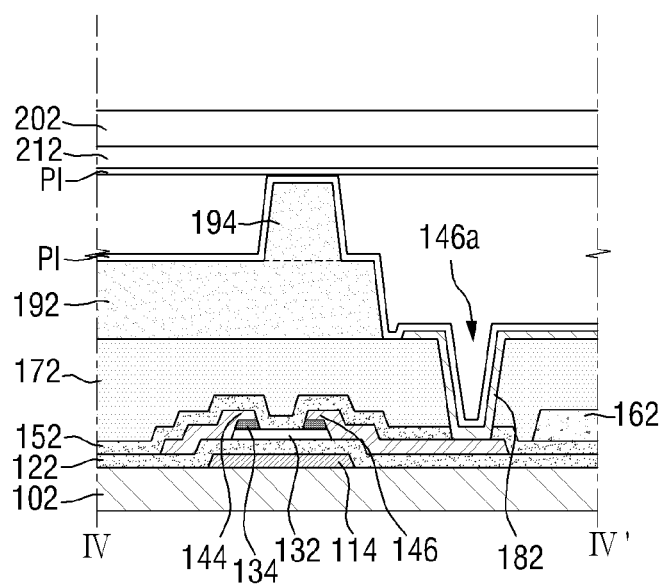
FIG. 4 is a cross-sectional view taken along line IV-IV' of FIG. 3.
Figure 5:
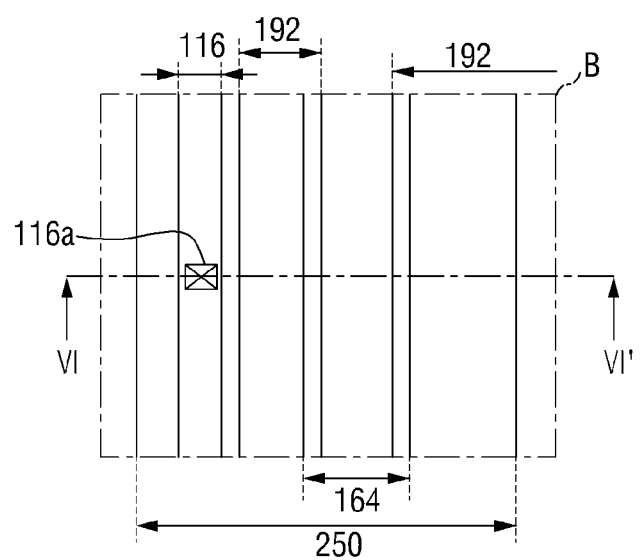
FIG. 5 is an enlarged view of region B of FIG. 2.
Figure 6:
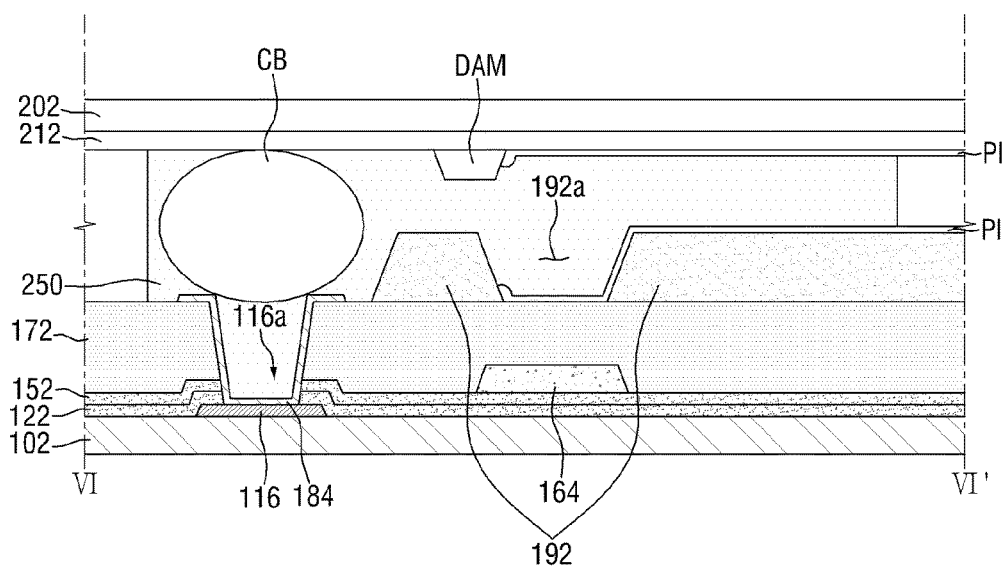
FIG. 6 is a cross-sectional view taken along line VI-VI' of FIG. 5.

FIG. 1 is a schematic exploded perspective view illustrating a liquid crystal display ("LCD") device according to an exemplary embodiment of the invention. FIG. 2 is a plan view of a first display substrate of the LCD device according to the exemplary embodiment of the invention. FIG. 3 is an enlarged view of region A of FIG. 2. FIG. 4 is a cross-sectional view taken along line IV-IV' of FIG. 3. FIG. 5 is an enlarged view of region B of FIG. 2. FIG. 6 is a cross-sectional view taken along line VI-VI' of FIG. 5.

Referring to FIGS. 1 to 6, an LCD device 10 includes a first display substrate 100, a second display substrate 200 facing the first display substrate 100, and a liquid crystal layer 300 interposed between the first display substrate 100 and the second display substrate 200.

The LCD device 10 includes a display area DA and a non-display area NDA. A plurality of pixels arranged in a matrix may be defined on the display area DA.

A pixel electrode 182 may be disposed for each pixel on the display area DA of the first display substrate 100. The pixel electrode 182 may be provided with a data voltage through a thin film transistor ("TFT"). A common electrode 212 which is unitary regardless of the pixels may be disposed on the entire surface of the display area DA on the second display substrate 200. The pixel electrode 182 may generate an electric field in cooperation with the common electrode 212 to control an alignment direction of liquid crystal molecules of the liquid crystal layer 300 disposed therebetween.

A data driver 400 that provides a data driving signal and a gate driver 500 that provides a gate driving signal may be disposed outside the display area DA of the first display substrate 100.

The data driver 400 may receive image signals and a data control signal from a timing controller (not shown). The data driver 400 may generate analog data voltages corresponding to the image signals in response to the data control signal. The data driver 400 may provide a data voltage to each pixel through a data line 142.

The data driver 400 may include a plurality of data driving chips 410. The data driving chips 410 may be disposed (e.g., mounted) on first flexible circuit boards 420 corresponding thereto and may be connected to a drive circuit board 430 and data pads (not shown) of the non-display area NDA. Although not shown, in an exemplary embodiment, the first flexible circuit boards 420 on which the data driving chips 410 are mounted may be connected to the corresponding data pads by anisotropic conductive films.

The gate driver 500 may generate gate signals in response to the gate control signal provided from the timing controller (not shown) mounted on the drive circuit board 430. The gate signals may be provided row by row sequentially to the pixels through gate lines 112. Although not shown, in an exemplary embodiment, the gate control signal may be provided to the gate driver 500 via second flexible circuit boards 520.

The gate driver 500 may include a plurality of gate driving chips 510. The gate driving chips 510 may be mounted on the second flexible circuit boards 520 corresponding thereto and may be connected to gate pads (not shown) of the non-display area NDA. Although not shown, in an exemplary embodiment, the second flexible circuit boards 520 on which the gate driving chips 510 are mounted may be connected to the corresponding gate pads by anisotropic conductive films.

In the exemplary embodiment, a Tape Carrier Package ("TCP") method in which the data driving chips 410 and the gate driving chips 510 are mounted on the first and second flexible circuit boards 420 and 520 has been described as an example, but the invention is not limited thereto. The driving chips may be mounted on the non-display area NDA by a Chip On Glass ("COG") method. Further, the gate driver 500 may be unitary on the non-display area NDA by an Amorphous Silicon Gate ("ASG") method.

The first display substrate 100 and the second display substrate 200 may be bonded by a sealing member 250 including a sealant or the like. The sealing member 250 may be disposed on the non-display area NDA as a peripheral portion of the first display substrate 100 and the second display substrate 200.

In exemplary embodiments, the sealing member 250 may be disposed on the non-display area NDA along a boundary between the display area DA and the non-display area NDA. In an exemplary embodiment, as shown in FIG. 2, the sealing member 250 may be implemented in a rectangular strip shape. However, this is merely illustrative, and the shape of the sealing member 250 is not limited thereto. The sealing member 250 may be implemented in various shapes according to the structure of the LCD device.

In exemplary embodiments, the sealing member 250 may include a conductive ball CB. A common voltage applied to common voltage lines 116 and 184 may be applied to the common electrode 212 disposed on a second substrate 202 through the conductive ball CB. The common voltage lines 116 and 184 may include a first common voltage line 116 and a second common voltage line 184. The second common voltage line 184 may be disposed on the first common voltage line 116. The first common voltage line 116 and the second common voltage line 184 may be connected electrically to each other through an opening 116a defined in a gate insulating film 122, a passivation layer 152, and an organic layer 172.

Specifically, the first common voltage line 116 may be in contact with the second common voltage line 184 disposed in the opening 116a, and the second common voltage line 184 may be in contact with the conductive ball CB. The conductive ball CB may be in contact with the common electrode 212 disposed on the second substrate 202. Accordingly, the common voltage applied to the first common voltage line 116 may be provided to the common electrode 212 through the second common voltage line 184 and the conductive ball CB.

In exemplary embodiments, the first common voltage line 116 may be disposed at the same level as that of the gate wirings, which will be described later. The second common voltage line 184 may be disposed at the same level as that of the pixel electrode 182, which will be described later. However, this is merely illustrative, and a structure of applying a common voltage to the common electrode 212 is not limited thereto.

A narrow bezel type LCD device may have the non-display area NDA which is narrower than that of the other types of LCD devices. Accordingly, as shown in FIG. 6, the sealing member 250 may be disposed to extend to a region in which an alignment layer PI is disposed as well as a short point region in which a common voltage is applied to the common electrode 212. That is, the sealing member 250 may be implemented as a structure in contact with the alignment layer PI. However, this is merely illustrative, and in the invention, a positional relationship between the sealing member 250 and the alignment layer PI is not limited thereto.

FIG. 6 illustrates a case where the conductive ball CB is disposed at the short point, but the invention is not limited thereto, and the conductive balls CB may be distributed and arranged at various locations in the sealing member 250. Further, the common voltage may be applied to the common electrode 212 through means other than the conductive ball CB.

The liquid crystal layer 300 including liquid crystal molecules having positive or negative dielectric anisotropy may be interposed between the first display substrate 100 and the second display substrate 200.

Hereinafter, a structure of the first display substrate 100 and the second display substrate 200 of the LCD device 10 according to the exemplary embodiment of the invention will be described in detail.

The first display substrate 100 uses a first substrate 102 as a base substrate. In an exemplary embodiment, the first substrate 102 may include an insulating material such as transparent glass, quartz, ceramic, silicon or transparent plastic, which may be selected appropriately according to the needs of those skilled in the art. In exemplary embodiments, the first substrate 102 may have flexibility. That is, the first substrate 102 may be a substrate that can be deformed (e.g., rolled, folded or bent).

A plurality of gate wirings 112 and 114 and data wirings 142, 144 and 146 may be disposed on the first substrate 102.

The gate wirings 112 and 114 may include a plurality of gate lines 112 and a plurality of gate electrodes 114. The data wirings 142, 144 and 146 may include a plurality of data lines 142, a plurality of source electrodes 144, and a plurality of drain electrodes 146.

In an exemplary embodiment, the gate wirings 112 and 114 and the data wirings 142, 144 and 146 may include aluminum-based metal such as aluminum (Al) and an aluminum alloy, silver-based metal such as silver (Ag) and a silver alloy, a copper-based metal such as copper (Cu) and a copper alloy, molybdenum-based metal such as molybdenum (Mo) and a molybdenum alloy, chromium (Cr), titanium (Ti), tantalum (Ta) or the like. Further, the gate wirings 112 and 114 and the data wirings 142, 144 and 146 may have a multilayer structure including two conductive films (not shown) having different physical properties. In an exemplary embodiment, one conductive film may include aluminum-based metal, silver-based metal, copper-based metal or the like, and the other conductive film may include molybdenum-based metal, chromium (Cr), titanium (Ti), tantalum (Ta) or the like, for example. As an example of such a combination, a lower chromium layer and an upper aluminum film, or a lower aluminum film and an upper molybdenum film may be mentioned. However, the invention is not limited thereto, and the gate wirings 112 and 114 and the data wirings 142, 144 and 146 may include various other types of metals and conductors.

Each of the gate lines 112 may extend in a first direction, for example, along the boundary of the pixels in a horizontal direction, and each of the data lines 142 may extend in a second direction, for example, along the boundary of the pixels in a vertical direction. The gate lines 112 and the data lines 142 may be arranged to intersect each other, thereby defining a pixel region. In other words, the pixel region may be defined by a region surrounded by the gate lines 112 and the data lines 142. However, the invention is not limited thereto, and the pixel region may not be defined by gate lines 112 and the data lines 142.

At least one gate electrode 114 is disposed for each pixel to be connected to each of the gate lines 112. The gate electrode 114 may be provided to be branched from the gate line 112 to a semiconductor layer 132 or provided by extending the gate line 112. However, this is not limited thereto, and the gate electrode 114 may be defined in a region overlapping with the semiconductor layer 132 on the extended path of the gate line 112.

At least one source electrode 144 is disposed for each pixel to be connected to each of the data lines 142. The source electrode 144 may be provided to be branched from the data line 142 to the semiconductor layer 132 or provided by extending the data line 142. However, this is not limited thereto, and the source electrode 144 may be defined in a region overlapping with the semiconductor layer 132 on the extended path of the data line 142. In an exemplary embodiment, the source electrode 144 may be located substantially on the same line as the data line 142 without protruding from the data line 142. A drain electrode 146 may be disposed to be spaced apart from the gate electrode 114 with respect to the semiconductor layer 132. The drain electrode 146 may be electrically connected to the pixel electrode 182 through a contact hole 146a provided to pass through the passivation layer 152 and the organic layer 172 to be described later.

The gate insulating film 122 may be disposed between the gate wirings 112 and 114 and the data wirings 142, 144 and 146. In one exemplary embodiment, the gate insulating film 122 may be disposed on the gate wirings 112 and 114, and the data wirings 142, 144 and 146 may be disposed on the gate insulating film 122. In an exemplary embodiment, the gate insulating film 122 may include, for example, silicon nitride ($SiN_x$), silicon oxide ($SiO_2$), silicon oxynitride (SiON), or a laminated film thereof. The gate insulating film 122 may serve to maintain insulation between the gate wirings 112 and 114 and conductive thin films such as the data lines 142 located thereon.

In an exemplary embodiment, the semiconductor layer 132 is disposed on the gate insulating film 122, and may include, for example, hydrogenated amorphous silicon or polycrystalline silicon. The semiconductor layer 132 is disposed so as to overlap with at least a portion of the gate electrode 114. The semiconductor layer 132, the gate electrode 114, the source electrode 144 and the drain electrode 146 constitute a TFT.

The semiconductor layer 132 may have various shapes such as an insular shape or a linear shape. FIG. 4 illustrates a case where the semiconductor layer 132 is provided in an insular shape, but it is not limited thereto. When the semiconductor layer 132 is provided in an insular shape, although not separately shown, the semiconductor layer 132 may overlap with the data wirings 142, 144 and 146.

In an exemplary embodiment, an ohmic contact layer 134 including n+ hydrogenated amorphous silicon doped with n-type impurities in high concentration, for example, may be disposed on the semiconductor layer 132. The ohmic contact layer 134 is located between the semiconductor layer 132 on the lower side and the source electrode 144 and the drain electrode 146 on the upper side, and serves to reduce the contact resistance. The ohmic contact layer 134 may have various shapes such as an insular shape or a linear shape similarly to the semiconductor layer 132. When the semiconductor layer 132 has an insular shape, the ohmic contact layer 134 may also have an insular shape. When the semiconductor layer 132 has a linear shape, the ohmic contact layer 134 may also have a linear shape. In the ohmic contact layer 134, unlike the semiconductor layer 132, the source electrode 144 and the drain electrode 146 facing each other are spaced apart from the each other to expose the semiconductor layer 132 located therebelow. In the semiconductor layer 132, a channel may be defined in a region where the source electrode 144 and the drain electrode 146 facing each other are spaced apart from the each other.

When the gate electrode 114 receives a gate-on signal and a channel is defined in the semiconductor layer 132, the TFT is turned on, and the drain electrode 146 may receive a data signal from the source electrode 144 and transmit the data signal to the pixel electrode 182.

The passivation layer 152 is disposed on the data wirings 142, 144 and 146 and the exposed semiconductor layer 132. The contact hole 146a exposing at least a portion of the drain electrode 146 may be defined in the passivation layer 152 and the organic layer 172, which will be described later. At least a portion of the drain electrode 146 exposed through the contact hole 146a may be in contact with the pixel electrode 182. Accordingly, the drain electrode 146 and the pixel electrode 182 may be electrically connected to each other.

In an exemplary embodiment, the passivation layer 152 may include, for example, an inorganic material such as silicon nitride or silicon oxide, a material such as a-Si:C:O and a-Si:O:F provided by plasma enhanced chemical vapor deposition ("PECVD").

The organic layer 172 may be disposed on the passivation layer 152. The organic layer 172 may include a material having excellent planarization characteristics and photosensitivity. The contact hole 146a exposing at least a portion of the drain electrode 146 may be defined in the organic layer 172.

In exemplary embodiments, as shown in FIG. 2, a color filter 162 may be disposed between the organic layer 172 and the passivation layer 152. In an exemplary embodiment, the color filter 162 may include a red (R) color filter, a green (G) color filter, and a blue (B) color filter. The R, G and B color filters are provided in one pixel to form R, G and B pixels. The color filter 162 may be disposed so as to overlap with the pixel electrode 182. The color filter 162 may include a photosensitive organic material including a pigment. The organic layer 172 may be disposed on the color filter 162 to planarize a stepped portion of the R, G and B color filters. The color filter 162 may be covered by the organic layer 172. That is, the color filter 162 may not have an exposed portion because it is covered by the organic layer 172. However, this is merely illustrative, and the invention is not limited to this structure.

The pixel electrode 182 may be disposed for each unit pixel on the organic layer 172. A portion of the pixel electrode 182 is disposed in the contact hole 146a. A portion of the pixel electrode 182 disposed in the contact hole 146a may be in contact with and electrically connected to the drain electrode 146.

When a data voltage is applied to the pixel electrode 182 through the contact hole 146a, the pixel electrode 182 may generate an electric field in cooperation with the common electrode 212 to rotate the liquid crystal molecules included in the liquid crystal layer 300. In an exemplary embodiment, the pixel electrode 182 may include a transparent conductive material such as indium tin oxide ("ITO") or indium zinc oxide ("IZO"), but it is not limited thereto.

A light shielding pattern 192 may be disposed on the organic layer 172 and the pixel electrode 182. The light shielding pattern 192 serves to prevent light leakage. The light shielding pattern 192 may be disposed in a TFT region and a non-pixel region (between the pixels and a region of the gate lines and the data lines).

In an exemplary embodiment, the light shielding pattern 192 may be provided to include a black organic polymer material including a black dye or pigment, or include metal (metal oxide) such as chromium and chromium oxide.

A column spacer 194 serves to maintain a distance between the first substrate 102 and the second substrate 202. In exemplary embodiments, an end portion of the column spacer 194 may be in contact with the second display substrate 200 as shown in FIG. 4. However, this is merely illustrative, and the end portion of the column spacer 194 may be disposed to be spaced apart by a predetermined distance from the second display substrate 200.

Although not shown, in an exemplary embodiment, the column spacer 194 may be implemented to include a plurality of column spacers having different height levels. In an exemplary embodiment, the column spacer 194 may include a main column spacer having a relatively high height level and a sub-column spacer having a relatively low height level. In this case, the distance between the first display substrate 100 and the second display substrate 200 may be maintained primarily by the main column spacer against an external pressure. When a greater pressure is applied, the distance between the first display substrate 100 and the second display substrate 200 may be maintained secondarily by a sub-column spacer 196.

The column spacer 194 may be provided in a region corresponding to the TFT. At least a portion of the column spacer 194 may overlap with the gate wirings 112 and 114. However, this is merely illustrative, and the arrangement of the column spacer 194 is not limited thereto.

The second display substrate 200 uses the second substrate 202 as a base substrate. The second substrate 202 may be an insulating substrate. Specifically, similarly to the first substrate 102, the second substrate 202 may include an insulating material such as transparent glass, quartz, ceramic, silicon or transparent plastic, which may be selected appropriately according to the needs of those skilled in the art. In exemplary embodiments, the second substrate 202 may have flexibility. That is, the second substrate 202 may be a substrate that can be deformed (e.g., rolled, folded or bent). The second substrate 202 may be disposed to face the first substrate 102.

The common electrode 212 may be disposed on the second substrate 202. The common electrode 212 may receive a common voltage to generate an electric field in cooperation with the pixel electrode 182, thereby controlling an alignment direction of liquid crystal molecules included in the liquid crystal layer 300. The common voltage applied to the common voltage lines 116 and 184 may be provided to the common electrode 212 through the conductive ball CB.

The common electrode 212 may be unitary over the entire pixel region surrounded by the gate lines 112 and the data lines 142. In an exemplary embodiment, the common electrode 212 may include a transparent conductive material such as ITO or IZO, but it is not limited thereto, for example.

The alignment layer PI may be disposed on each of one surface of the first substrate 102 and one surface of the second substrate 202 facing the liquid crystal layer 300. That is, the alignment layer PI capable of aligning the liquid crystal layer 300 may be disposed on the pixel electrode 182, the common electrode 212, the light shielding pattern 192 and the column spacer 194. In an exemplary embodiment, the alignment layer PI may include resinous polymer such as polyimide, polyamic acid, polyamide, polyamic imide, polyester, polyethylene, polyurethane or polystyrene, or a combination thereof. Further, the alignment layer PI may be implemented to include a monomer of the above-mentioned resinous polymer.

In exemplary embodiments, as shown in FIG. 6, a dam structure DAM for preventing the flow of the alignment layer may be disposed on one surface of the second substrate 202. The dam structure DAM may be disposed on the common electrode 212, but it is not limited thereto. The dam structure DAM may be disposed more inward on the second substrate 202 than the short point at which a common voltage is applied to the common electrode 212. The alignment layer PI disposed on the second substrate 202 may not be disposed at the short point by a stepped portion of the dam structure DAM structure. However, this is merely illustrative, and the invention is not limited thereto.

A narrow bezel type LCD device may have the non-display area NDA which is narrower than that of the other types of LCD devices. Accordingly, the alignment layer PI having resinous properties may be disposed at the short point of the non-display area NDA during the formation of the alignment layer PI. When the alignment layer PI is disposed at the short point, the application of the voltage to the common electrode 212 through the gate electrode 114 may not be achieved smoothly.

Thus, in order to prevent the alignment layer PI from being disposed at the short point, a method of forming a structure (e.g., a dam structure DAM) capable of blocking the flow of the alignment layer PI, in the vicinity of the boundary between the display area DA and the non-display area NDA may be taken into consideration. However, in order to form the dam structure DAM, it requires an additional masking process, which may result in an increase in costs of the process and complexity of the process procedures.

The invention is intended to provide an LCD device having a structure of preventing the spreading of the alignment layer. An open portion 192a may be defined in the light shielding pattern 192 of the LCD device 10 according to the exemplary embodiment of the invention. The open portion 192a may be defined in the non-display area NDA. The open portion 192a may be defined in the light shielding pattern 192. Accordingly, the light shielding pattern 192 may be divided by the open portion 192a in its cross-sectional shape. More particularly, the open portion 192a may be disposed more inward on the first substrate 102 than the short point at which a common voltage is applied to the common electrode 212. In the exemplary embodiment of FIG. 2, the open portion 192a may be implemented in a rectangular strip shape in a plan view. However, this is merely illustrative, and the shape of the open portion 192a is not limited thereto In exemplary embodiments, as shown in FIG. 6, the sealing member 250 may be disposed on the open portion 192a. However, this is merely illustrative, and an arrangement relationship between the open portion 192a and the sealing member 250 in the invention is not limited thereto.

The structure of the open portion 192a defined in the light shielding pattern 192 may serve to prevent the alignment layer PI from flowing to the short point in a manufacturing process of the LCD device 10. That is, the alignment layer PI may stagnate in the open portion 192a due to a step provided by the open portion 192a defined in the light shielding pattern 192, thereby preventing the alignment layer PI from flowing to the short point. In other words, by the structure of the open portion 192a, the alignment layer PI may not be disposed in a region where the second common voltage line 184 is in contact with the conductive ball CB. As shown in FIG. 6, a portion of the alignment layer PI may be disposed in the open portion 192a.

In the exemplary embodiment of FIG. 6, a structure in which the open portion 192a is defined in the light shielding pattern 192 to expose a portion of the surface of the organic layer 172 has been illustrated. However, it is not limited to this structure when a stepped portion is provided in the light shielding pattern 192 such that the alignment layer PI can stagnate in the stepped portion. In an exemplary embodiment, the light shielding pattern 192 may be implemented as a structure including a stepped portion such that the alignment layer can stagnate in the stepped portion without exposing the surface of the organic layer 172.

In exemplary embodiments, the LCD device 10 may include a light shielding colored layer 164. The light shielding colored layer 164 is disposed below the light shielding pattern 192, and may serve to prevent the light leakage occurring through the open portion 192a.

The light shielding colored layer 164 may be disposed at a position corresponding to the open portion 192a of the light shielding pattern 192. At least a portion of the light shielding colored layer 164 may overlap with the open portion 192a. In exemplary embodiments, the width of the light shielding colored layer 164 may be larger than the width of the open portion 192a as shown in FIG. 6. However, this is merely illustrative, and the invention is not limited to this structure. The term "width" used herein refers to a length in a lateral direction on the drawing, i.e., FIG. 6.

In exemplary embodiments, the light shielding colored layer 164 may be disposed at the same level as the color filter 162 as shown in FIG. 6. That is, the light shielding colored layer 164 may be disposed on the passivation layer 152. The light shielding colored layer 164 may include a photosensitive organic material including a pigment. In an exemplary embodiment, the light shielding colored layer 164 may be implemented to include the same materials as the blue color filter. That is, the light shielding colored layer 164 may be blue. However, this is merely illustrative, and the arrangement and material of the light shielding colored layer 164 are not limited thereto.

Figure 7:
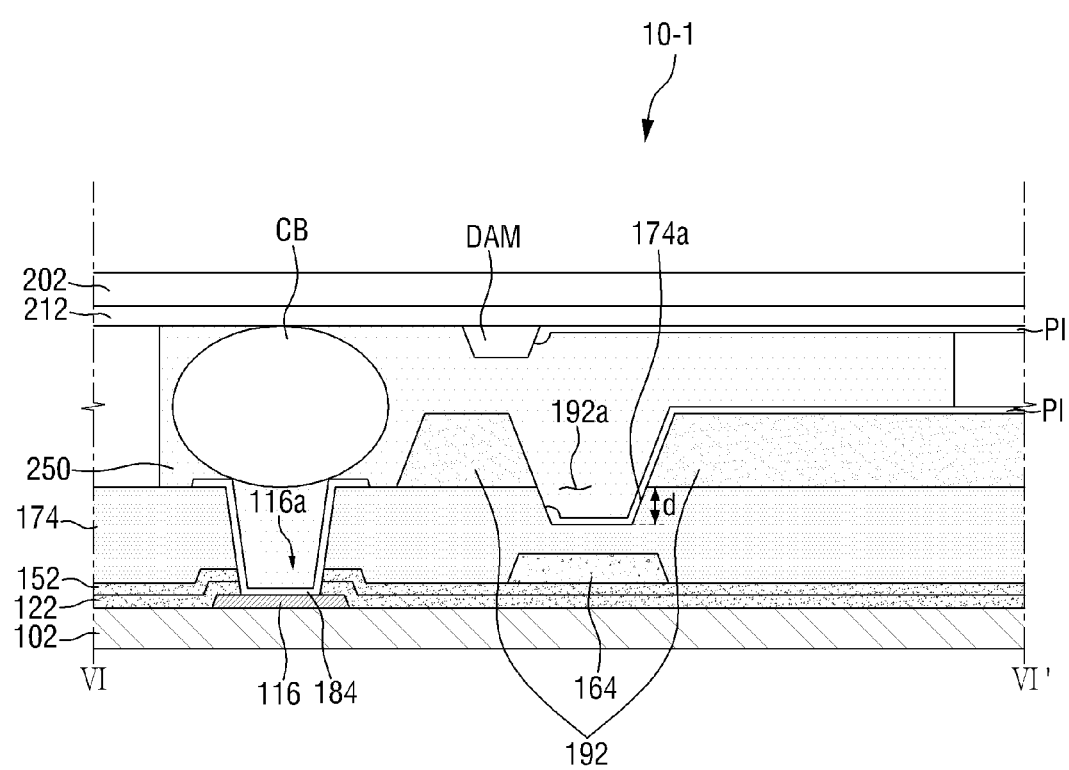
FIG. 7 is a cross-sectional view of an LCD device according to another embodiment of the invention, which is taken along a line corresponding to line VI-VI' of FIG. 5.

FIG. 7 is a cross-sectional view of an LCD device according to another embodiment of the invention, which is taken along a line corresponding to line VI-VI' of FIG. 5.

Referring to FIG. 7, an LCD device 10-1 according to another embodiment of the invention includes an organic layer 174 having a different configuration compared to the LCD device 10 described with reference to FIGS. 1 to 6, and the other configuration of the LCD device 10-1 may be the same or similar to the LCD device 10. The following description will mainly focus on the difference, and redundant description will be omitted.

In the exemplary embodiment, a stepped portion 174a is defined in the organic layer 174 at the position corresponding to the open portion 192a. At least a portion of the open portion 192a may overlap with the stepped portion 174a. The stepped portion 174a and the open portion 192a may be disposed consecutively. At least a portion of the light shielding colored layer 164 may overlap with the stepped portion 174a. By providing a step d due to the stepped portion 174a in addition to a step due to the open portion 192a, it is possible to effectively prevent the alignment layer PI from flowing to a short point 116a. As shown in FIG. 7, a portion of the alignment layer PI may be disposed in the stepped portion 174a.

Figure 8:
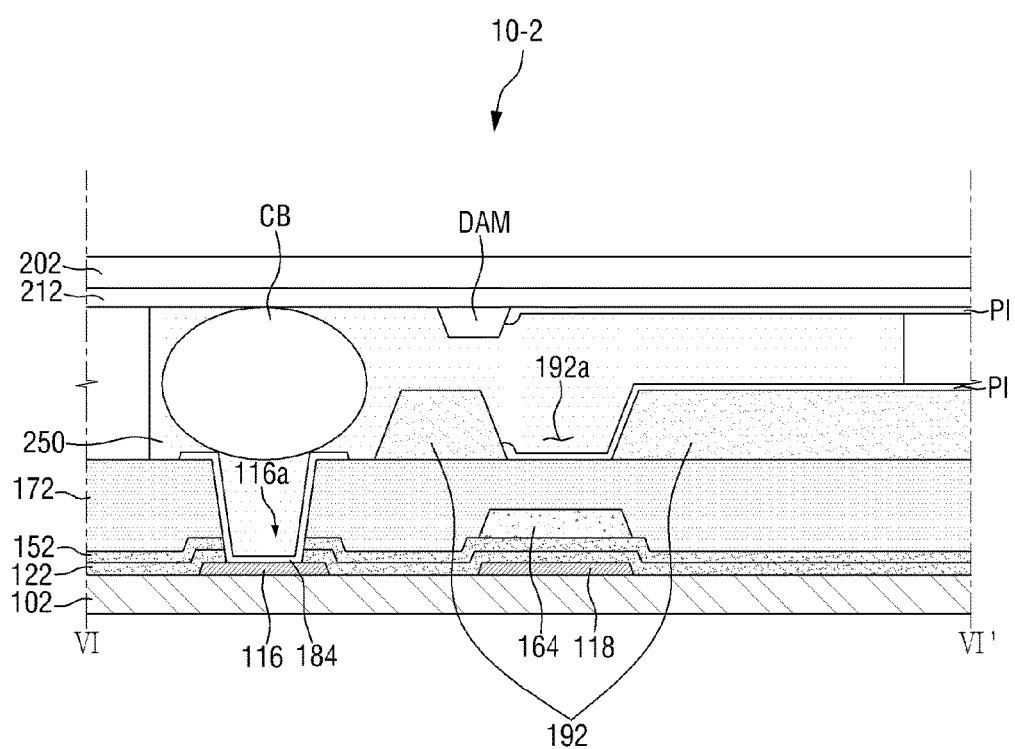
FIGS. 8 and 12 are cross-sectional views of an LCD device according to another embodiment of the invention, which are taken along a line corresponding to line VI-VI' of FIG. 5.
Figure 9:
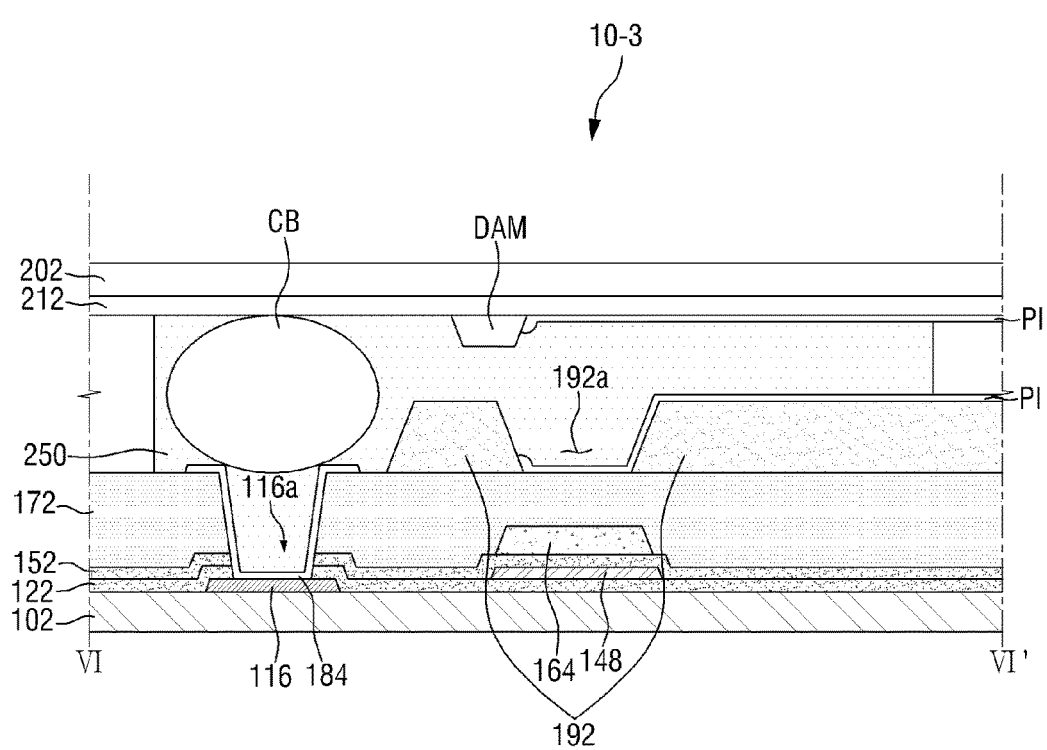

FIGS. 8 and 9 are cross-sectional views of an LCD device according to another embodiment of the invention, which are taken along a line corresponding to line VI-VI' of FIG. 5.

Referring to FIG. 8, an LCD device 10-2 according to another embodiment of the invention additionally includes a light shielding metal layer 118 compared to the LCD device 10 described with reference to FIGS. 1 to 6, and the other configuration of the LCD device 10-2 may be the same or similar to the LCD device 10. The following description will mainly focus on the difference, and redundant description will be omitted.

In the exemplary embodiment, the light shielding metal layer 118 is disposed below the light shielding pattern 192, and may serve to prevent the light leakage occurring through the open portion 192a. The light shielding metal layer 118 may be disposed at a position corresponding to the open portion 192a. At least a portion of the light shielding metal layer 118 may overlap with the open portion 192a. At least a portion of the light shielding metal layer 118 may overlap with the light shielding colored layer 164. The light leakage can be effectively prevented by the light leakage prevention effect of the light shielding metal layer 118 in addition to the light leakage prevention effect of the light shielding colored layer 164.

In exemplary embodiments, the light shielding metal layer 118 may be disposed at the same level as the gate wirings 112 and 114 as shown in FIG. 8. That is, the light shielding metal layer 118 may be disposed between the first substrate 102 and the gate insulating film 122. The light shielding metal layer 118 may include the same material as those of the gate wirings 112 and 114. However, this is merely illustrative, and the arrangement of the light shielding metal layer 118 is not limited thereto.

Referring to FIG. 9, an LCD device 10-3 according to another embodiment of the invention includes a light shielding metal layer 148 having a different configuration compared to the LCD device 10-2 described with reference to FIG. 8, and the other configuration of the LCD device 10-3 may be the same or similar to the LCD device 10-2. The following description will mainly focus on the difference, and redundant description will be omitted.

In the exemplary embodiment, the light shielding metal layer 148 may be disposed at the same level as the data wirings 142, 144 and 146 (refer to FIG. 4). That is, the light shielding metal layer 148 may be disposed between the passivation layer 152 and the gate insulating film 122. The light shielding metal layer 118 may include the same material as those of the data wirings 142, 144 and 146.

The exemplary embodiment of FIG. 8 illustrates a case where the light shielding metal layer 118 is disposed at the same level as the gate wirings, and the exemplary embodiment of FIG. 9 illustrates a case where the light shielding metal layer 148 is disposed at the same level as the data wirings, but the arrangement of the light shielding metal layer is not limited thereto. In an exemplary embodiment, the light shielding metal layer may be disposed at the same level as both of the gate wirings and the data wirings. In an alternative exemplary embodiment, the light shielding metal layer may be disposed at a level different from those of the gate wirings and the data wirings.

Figure 10:
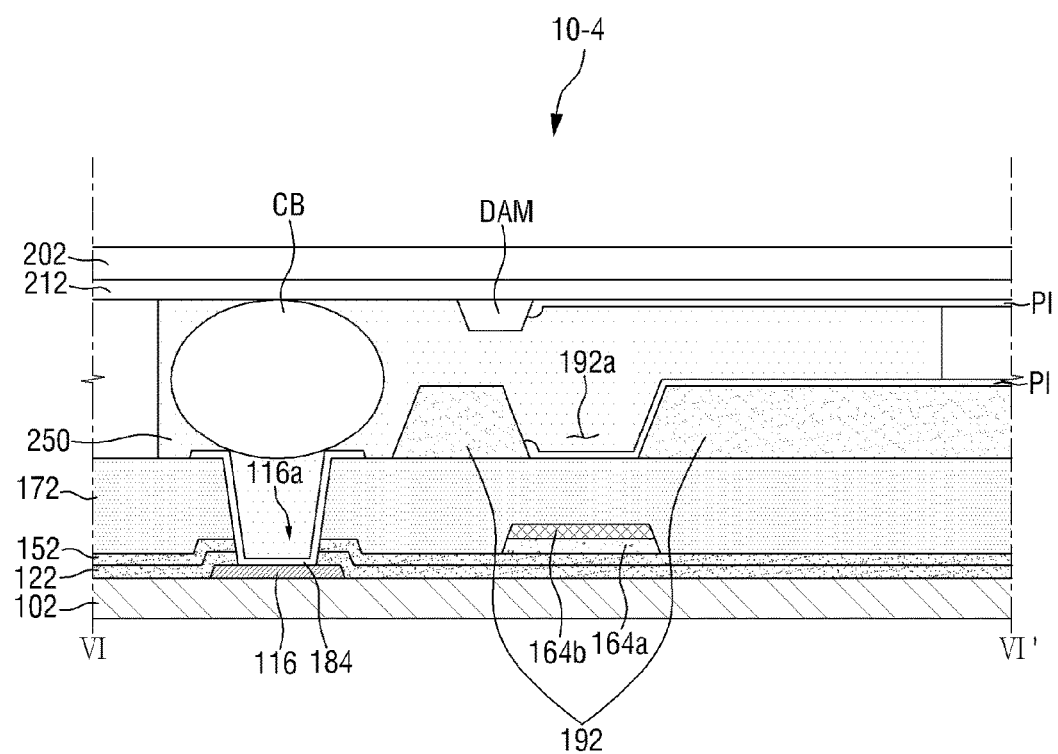

FIG. 10 is a cross-sectional view of an LCD device according to another embodiment of the invention, which is taken along a line corresponding to line VI-VI' of FIG. 5.

Referring to FIG. 10, an LCD device 10-4 according to another embodiment of the invention includes light shielding colored layers 164a and 164b having a different configuration compared to the LCD device 10 described with reference to FIGS. 1 to 6, and the other configuration of the LCD device 10-4 may be the same or similar to the LCD device 10. The following description will mainly focus on the difference, and redundant description will be omitted.

In the exemplary embodiment, the light shielding colored layers 164a and 164b include a first light shielding colored layer 164a and a second light shielding colored layer 164b, which are stacked sequentially. The second light shielding colored layer 164b may be disposed on the first light shielding colored layer 164a. The first light shielding colored layer 164a and the second light shielding colored layer 164b may overlap each other. In the exemplary embodiment, a case where the first light shielding colored layer 164a and the second light shielding colored layer 164b include surfaces in contact with each other has been illustrated, but the invention is not limited thereto. That is, another layer may be interposed between the first light shielding colored layer 164a and the second light shielding colored layer 164b.

The light shielding colored layers 164a and 164b may include a photosensitive organic material including a pigment. In an exemplary embodiment, the first light shielding colored layer 164a and the second light shielding colored layer 164b may be implemented to include the same material as any one of a red color filter, a green color filter, and a blue color filter, for example. The first light shielding colored layer 164a and the second light shielding colored layer 164b may include photosensitive organic materials including pigments in different colors. In an exemplary embodiment, the first light shielding colored layer 164a may be implemented to include the same material as a blue color filter, and the second light shielding colored layer 164b may be implemented to include the same material as a red color filter, for example. That is, the first light shielding colored layer 164a may be blue, and the second light shielding colored layer 164b may be red. However, this is merely illustrative, and a color combination of the first light shielding colored layer 164a and the second light shielding colored layer 164b is not limited thereto.

The light shielding colored layers 164a and 164b are disposed below the light shielding pattern 192, and may serve to prevent the light leakage occurring through the open portion 192a. The light leakage can be effectively prevented by the light leakage prevention effect of the second light shielding colored layer 164b in addition to the light leakage prevention effect of the first light shielding colored layer 164a.

In exemplary embodiments, the light shielding colored layers 164a and 164b may be implemented as two layers as shown in FIG. 10. However, this is merely illustrative, and the light shielding colored layers 164a and 164b may be implemented as three or more layers.

Figure 11:
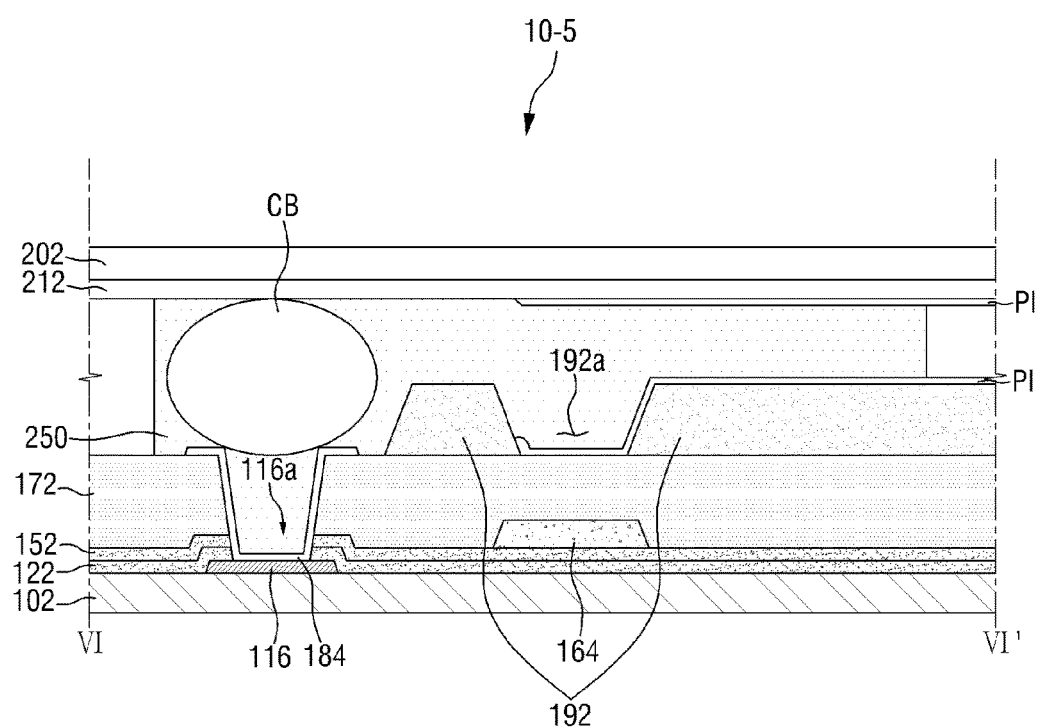

FIG. 11 is a cross-sectional view of an LCD device according to another embodiment of the invention, which is taken along a line corresponding to line VI-VI' of FIG. 5.

Referring to FIG. 11, an LCD device 10-5 according to another embodiment of the invention does not include a dam structure DAM compared to the LCD device 10 described with reference to FIGS. 1 to 6, and the other configuration of the LCD device 10-5 may be the same or similar to the LCD device 10. The following description will mainly focus on the difference, and redundant description will be omitted.

In the exemplary embodiment, a separate dam structure DAM for preventing the alignment layer PI from extending to the short point is not disposed on the second substrate 202. In the exemplary embodiment, after the alignment layer PI is disposed on the second substrate 202 in a manufacturing process, the alignment layer PI provided in a short point region is removed by, e.g., a laser trench process. Accordingly, as shown in FIG. 11, the exemplary embodiment may be implemented as a structure in which the alignment layer PI is not disposed at the short point without a separate dam structure DAM. In addition, in the first substrate 102 which includes a drive circuit for driving the LCD device, when the alignment layer PI is removed by a process involving a high-temperature process such as a laser trench process, there is a risk of damaging the drive circuit. However, in the second substrate 202 which does not include the drive circuit, even when the alignment layer PI is removed by a laser trench process or the like, there is no risk of damage to the drive circuit.

Figure 12:
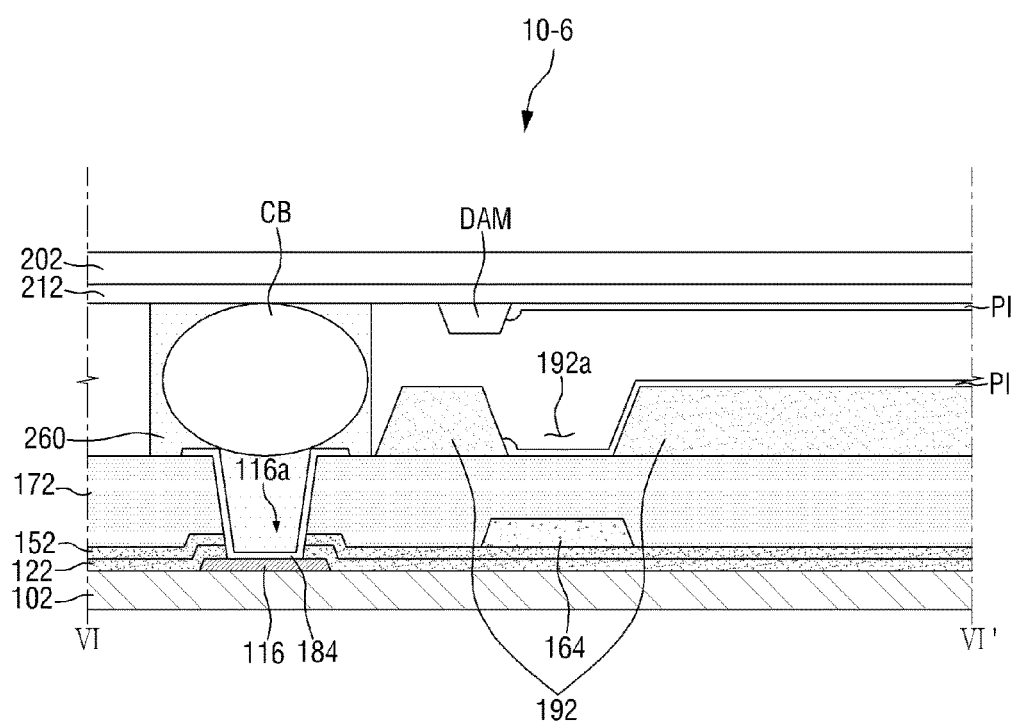

FIG. 12 is a cross-sectional view of an LCD device according to another embodiment of the invention, which is taken along line VI-VI' of FIG. 5.

Referring to FIG. 12, an LCD device 10-6 according to another embodiment of the invention includes a sealing member 260 having a different configuration compared to the LCD device 10 described with reference to FIGS. 1 to 6, and the other configuration of the LCD device 10-6 may be the same or similar to the LCD device 10. The following description will mainly focus on the difference, and redundant description will be omitted.

In the exemplary embodiment, the sealing member 260 is disposed in a short point region in which a common voltage is applied to the common electrode 212. The sealing member 260 may not be disposed in a region in which the alignment layer PI is disposed. That is, the sealing member 260 may be implemented as a structure not in contact with the alignment layer PI.

Next, a method of manufacturing the LCD device 10 according to the exemplary embodiment of the invention will be described.

FIGS. 13 to 27 are cross-sectional views illustrating the steps of a method of manufacturing an LCD device according to an exemplary embodiment of the invention.

Figure 13:
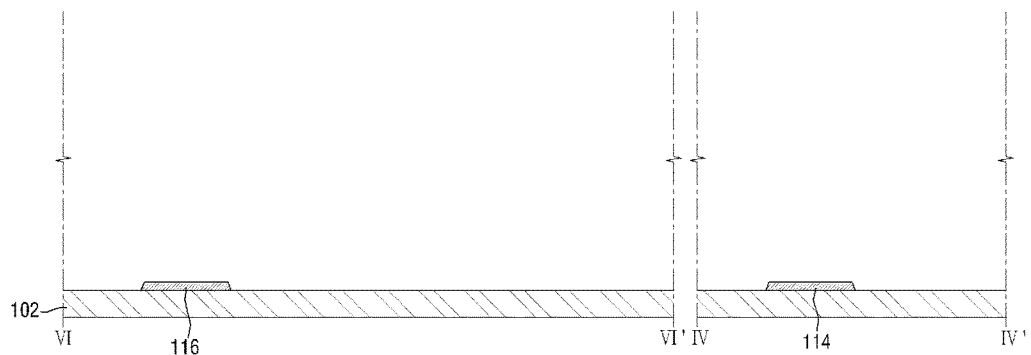
FIGS. 13 to 27 are cross-sectional views illustrating the steps of an exemplary embodiment of a method of manufacturing an LCD device according to the invention.

First, referring to FIGS. 4, 6 and 13, the gate wirings 112 and 114 are disposed on the first substrate 102.

A first metal layer (not shown) is disposed on the first substrate 102 including a transparent material such as glass and quartz. In an exemplary embodiment, the first metal layer (not shown) may include aluminum, copper, silver, molybdenum, chromium, titanium, tantalum or an alloy thereof, and may include two or more layers having different physical properties, for example. In an exemplary embodiment, the first metal layer (not shown) is deposited by, for example, a sputtering process, for example. Then, the first metal layer (not shown) is patterned by a photolithography process using an exposure mask to form the gate wirings 112 and 114 including the gate lines 112 and the gate electrodes 114. The gate electrodes 114 may be provided to be branched and protrude from the gate lines 112.

In exemplary embodiments, the first common voltage line 116 may be provided through the same process as the gate wirings 112 and 114. In this case, the first common voltage line 116 may include the same material at the same level as those of the gate wirings 112 and 114. However, this is merely illustrative, and the first common voltage line 116 may not be provided at the same time as the gate wirings 112 and 114. Further, the first common voltage line may not be provided at the same level as the gate wirings 112 and 114.

Referring back to FIG. 8, in exemplary embodiments, the light shielding metal layer 118 may be provided through the same process as the gate wirings 112 and 114. In this case, the light shielding metal layer 118 may include the same material at the same level as the gate wirings 112 and 114. However, this is merely illustrative, and the light shielding metal layer may not be provided at the same time as the gate wirings 112 and 114. Further, the light shielding metal layer may not be provided at the same level as the gate wirings 112 and 114.

Figure 14:
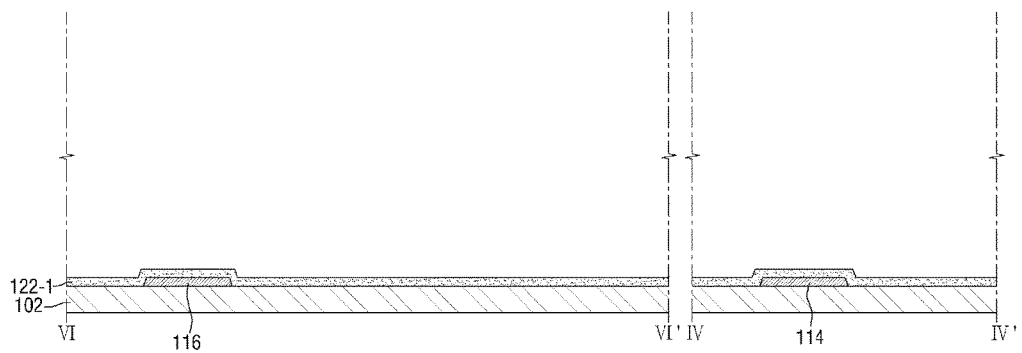

Then, referring to FIG. 14, a gate insulating film 112-1 is disposed on the gate wirings 112 and 114. In an exemplary embodiment, the gate insulating film 112-1 may be provided by PECVD, and may include silicon nitride (SiNx) or silicon oxide ($SiO_2$) or the like, for example.

Figure 15:
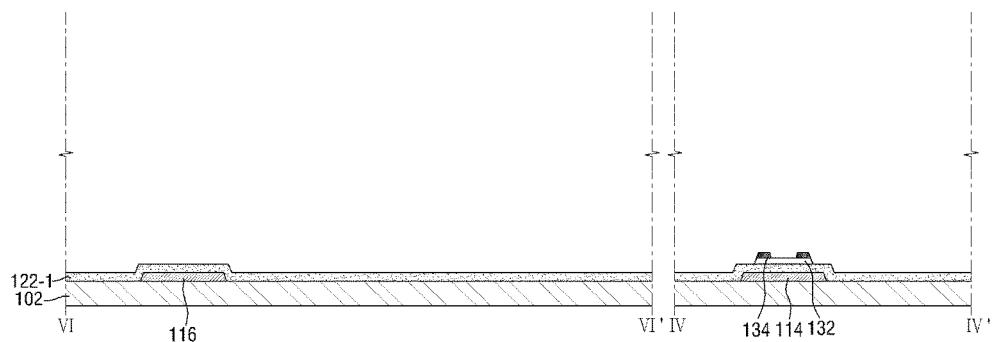

Then, referring to FIG. 15, the semiconductor layer 132 and the ohmic contact layer 134 are disposed on a gate insulating film 122-1. In an exemplary embodiment, the semiconductor layer 132 may be provided using hydrogenated amorphous silicon or polycrystalline silicon, for example. In an exemplary embodiment, the semiconductor layer 132 and the ohmic contact layer 134 may be provided through a photolithography process, for example.

Figure 16:
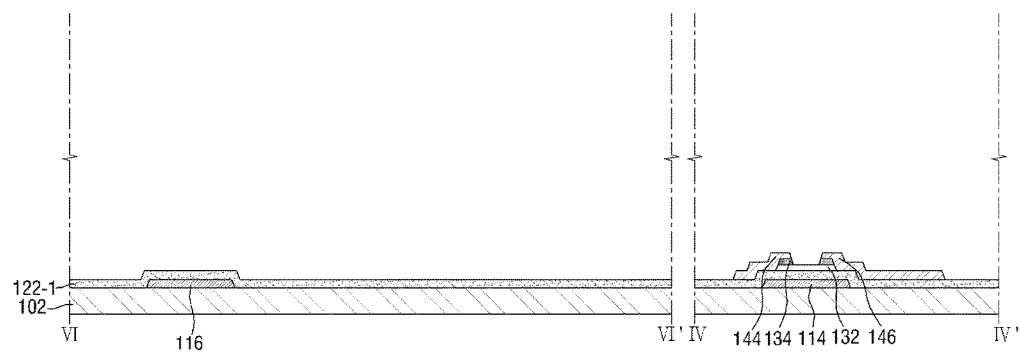

Then, referring to FIG. 16, the data wirings 142, 144 and 146 including the data lines 142 intersecting the gate lines 112 to define unit pixels, the source electrodes 144 and the drain electrodes 146 are disposed on the gate insulating film 122, the semiconductor layer 132 and the ohmic contact layer 134 through a photolithography process, for example. Similarly to the gate wirings 112 and 114, the data wirings 142, 144 and 146 may include aluminum, copper, silver, molybdenum, chromium, titanium, tantalum or an alloy thereof, and may include two or more layers having different physical properties, for example.

Referring back to FIG. 9, in exemplary embodiments, the light shielding metal layer 148 may be provided through the same process as the data wirings 142, 144 and 146. In this case, the light shielding metal layer 148 may include the same material at the same level as the data wirings 142, 144 and 146. However, this is merely illustrative, and the light shielding metal layer may not be provided at the same time as the data wirings 142, 144 and 146. Further, the light shielding metal layer may not be provided at the same level as the data wirings 142, 144 and 146.

Figure 17:
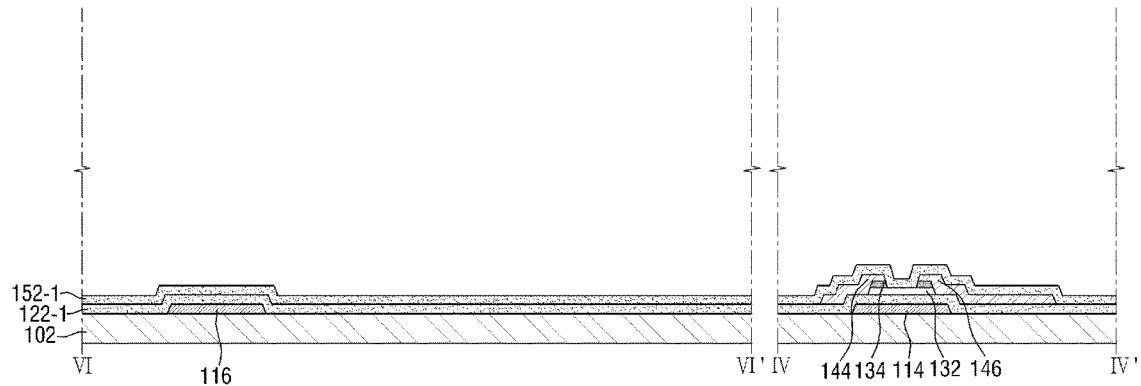

Then, referring to FIG. 17, a passivation layer 152-1 is disposed on the first substrate 102 on which TFT s are disposed. In an exemplary embodiment, the passivation layer 152-1 may include an inorganic material such as silicon nitride or silicon oxide, and may be provided to include a material such as a-Si:C:O and a-Si:O:F by PECVD.

Figure 18:
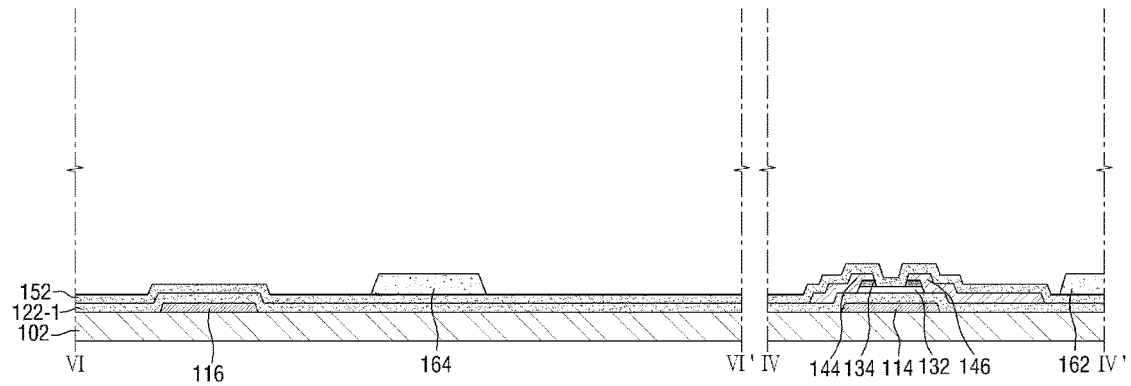

Then, referring to FIG. 18, the color filter 162 is disposed on the passivation layer 152-1. In an exemplary embodiment, the color filter 162 may be disposed on the pixel region, and may include a red (R) color filter, a green (G) color filter, and a blue (B) color filter, for example. In an exemplary embodiment, the color filter 162 may include a photosensitive organic material including a pigment, for example. In an exemplary embodiment, the color filter 162 may be provided by a photolithography process or an inkjet printing method, for example. However, the invention is not limited thereto, and various other methods may be applied.

In exemplary embodiments, the light shielding colored layer 164 may be provided through the same process as the color filter 162. In this case, the light shielding colored layer 164 may be provided at the same level as the color filter 162. The light shielding colored layer 164 may include a photosensitive organic material including a pigment. In an exemplary embodiment, the light shielding colored layer 164 may be implemented to include the same material as a blue color filter. However, this is merely illustrative, and the material of the light shielding colored layer 164 is not limited thereto.

In exemplary embodiments, the light shielding colored layer may be provided to include a plurality of layers. In an exemplary embodiment, referring back to FIG. 10, the light shielding colored layer may be provided to include a first light shielding colored layer and a second light shielding colored layer. The first light shielding colored layer and the second light shielding colored layer may include photosensitive organic materials including pigments in different colors. The first light shielding colored layer may include the same material as that of a blue color filter, and the second light shielding colored layer may include the same material as that of a red color filter. However, this is merely illustrative, and a color combination of the first light shielding colored layer and the second light shielding colored layer is not limited thereto.

Figure 19:
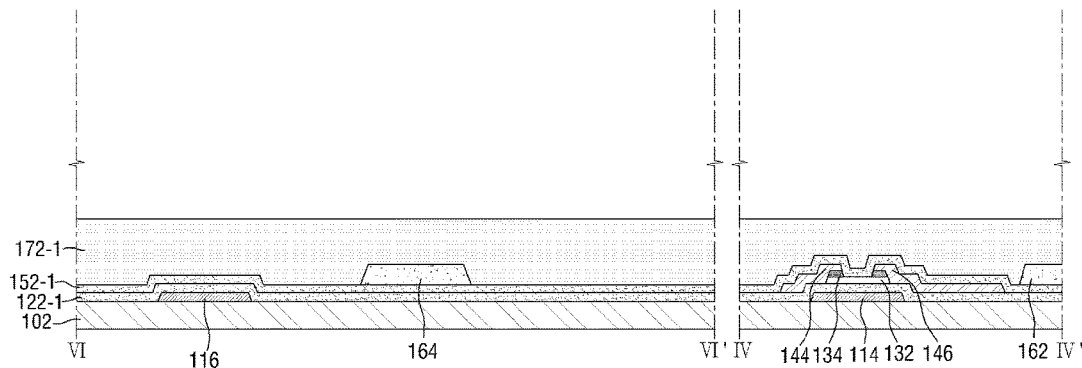

Then, referring to FIG. 19, an organic layer 172-1 is disposed on the passivation layer 152-1 and the color filter 162. The organic layer 172-1 may include a material having excellent planarization characteristics and photosensitivity. In an exemplary embodiment, the organic layer 172-1 may be provided by a spin coating method or a slit coating method, or may be provided by simultaneously using a spin coating method and a slit coating method, for example.

Figure 20:
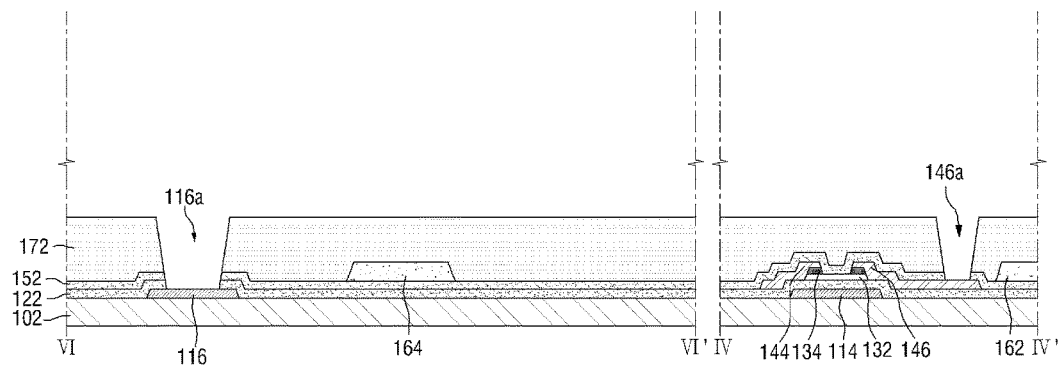

Then, referring to FIG. 20, the contact hole 146a exposing at least a portion of the drain electrode 146 is defined in the passivation layer 152-1 and the organic layer 172-1. Specifically, the contact hole 146a may be defined in the organic layer 172-1 to form the organic layer 172, and then, the contact hole 146a may be defined in the passivation layer 152-1 to form the passivation layer 152.

In exemplary embodiments, the contact hole 116a exposing at least a portion of the first common voltage line 116 is defined in the passivation layer 152-1, the organic layer 172-1 and the gate insulating film 122-1. Specifically, the contact hole 116a is defined in the organic layer 172-1 to form the organic layer 172, and then, the contact hole 116a is defined in the passivation layer 152-1 to form the passivation layer 152. Then, the contact hole 116a is defined in the gate insulating film 122-1 to form the gate insulating film 122.

Figure 21:
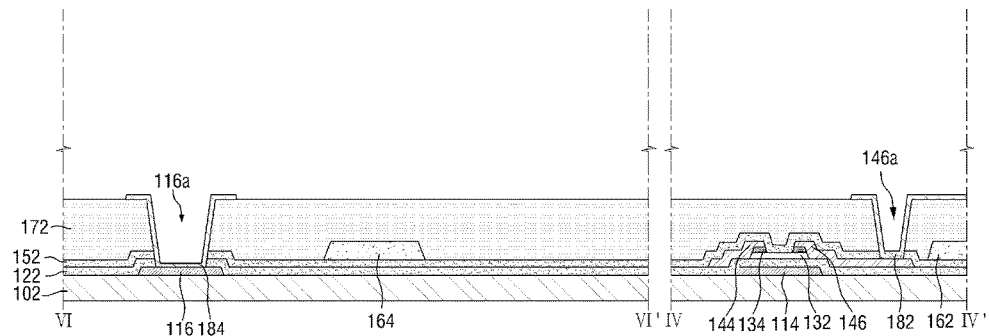

Then, referring to FIG. 21, the pixel electrode 182 is disposed on the organic layer 172. Specifically, the pixel electrode 182 may be provided to be in contact with at least a portion of the drain electrode 146 exposed through the contact hole 146a disposed in the organic layer 172 and the passivation layer 152. Through such contact, the pixel electrode 182 may be electrically connected to the drain electrode 146.

In exemplary embodiments, the second common voltage line 184 may be provided through the same process as the pixel electrode 182. In this case, the second common voltage line 184 may include the same material at the same level as that of the pixel electrode 182. However, this is merely illustrative, and the second common voltage line 184 may not be provided by the same process as the pixel electrode 182.

Figure 22:
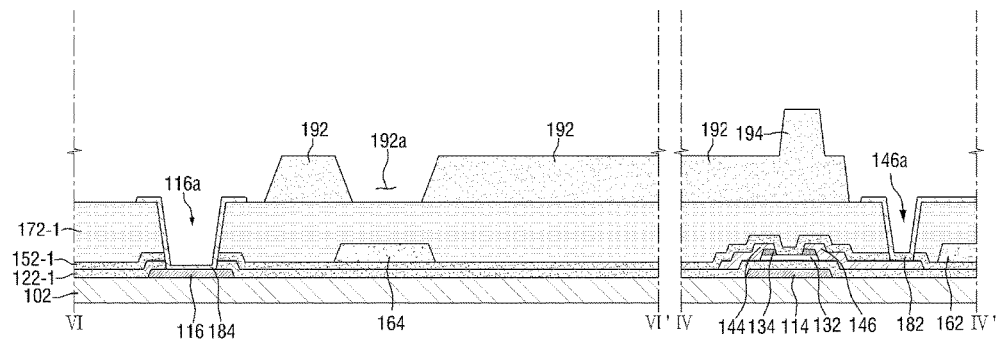

Then, referring to FIG. 22, the light shielding pattern 192 may be disposed on the pixel electrode 182 and the organic layer 172. The light shielding pattern 192 may be provided in a region where the liquid crystal molecules included in the liquid crystal layer 300 do not operate, for example, a TFT region and a non-pixel region (between the pixels and a region of the gate lines and the data lines). The light shielding pattern 192 may be provided using a black organic polymer material including a black dye or pigment, or metal (metal oxide) such as chromium and chromium oxide.

Then, the column spacer 194 is disposed on the light shielding pattern 192. As shown in FIG. 22, the column spacer 194 may be provided to be unitary with the light shielding pattern 192. That is, the column spacer 194 and the light shielding pattern 192 may be provided at the same time. In an exemplary embodiment, through the exposure using a half-tone mask or slit mask, the column spacer 194 and the light shielding pattern 192 may include the same material through the same patterning process. However, this is merely illustrative, and the invention is not limited thereto.

The column spacer 194 may be provided in a region corresponding to the TFT as illustrated in FIG. 22. However, this is merely illustrative, and the formation position of the column spacer 194 is not limited thereto.

A narrow bezel type LCD device may have the non-display area NDA which is narrower than that of the other types of LCD devices. Accordingly, in the subsequent process of forming the alignment layer PI having resinous properties, the alignment layer PI may be disposed at the short point of the non-display area NDA. When the alignment layer PI is disposed at the short point, the application of the voltage to the common electrode 212 through the gate electrode 114 may not be achieved smoothly.

Thus, in order to prevent the alignment layer PI from being disposed at the short point, a method of forming a structure (e.g., a dam structure DAM), capable of blocking the flow of the alignment layer PI, in the vicinity of the boundary between the display area DA and the non-display area NDA may be taken into consideration. However, in order to form the dam structure DAM, it requires an additional masking process, which may result in an increase in costs of the process and complexity of the process procedures.

Thus, the open portion 192a may be defined in the light shielding pattern 192. The open portion 192a may be defined in the non-display area NDA. More particularly, the open portion 192a may be disposed more inward on the first substrate 102 than the short point at which a common voltage is applied to the common electrode 212.

The structure of the open portion 192a defined in the light shielding pattern 192 may serve to prevent the alignment layer PI from flowing to the short point in the subsequent process of forming the alignment layer PI. That is, the alignment layer PI may stagnate in the open portion 192a due to a step provided by the open portion 192a defined in the light shielding pattern 192, thereby preventing the alignment layer PI from flowing to the short point. In other words, a structure of effectively preventing the alignment layer PI from being provided at the short point can be provided without an additional mask process.

Figure 23:
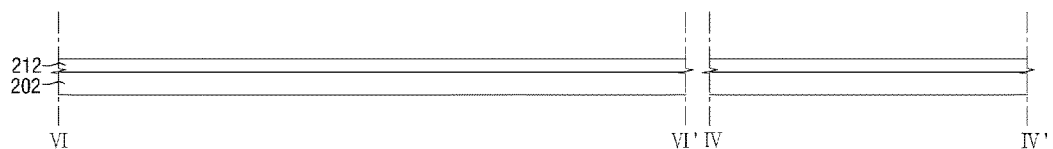

Then, referring to FIG. 23, the common electrode 212 is disposed on the second substrate 202. The common electrode 212 may be unitary over the entire pixel region surrounded by the gate lines 112 and the data lines 142. The common voltage applied to the common voltage lines 116 and 184 may be provided to the common electrode 212 through the conductive ball CB. The common electrode 212 may include a transparent conductive material such as ITO or IZO, but it is not limited thereto.

Figure 24:
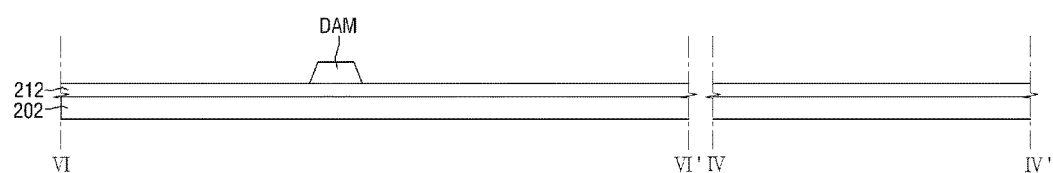

Then, referring to FIG. 24, a dam structure DAM for preventing the flow of the alignment layer is disposed on the common electrode 212 of the second substrate 202. The dam structure DAM may be disposed more inward on the second substrate 202 than the short point at which a common voltage is applied to the common electrode 212. In an exemplary embodiment, the dam structure DAM may include a material having photosensitivity, but it is not limited thereto.

Figure 25:
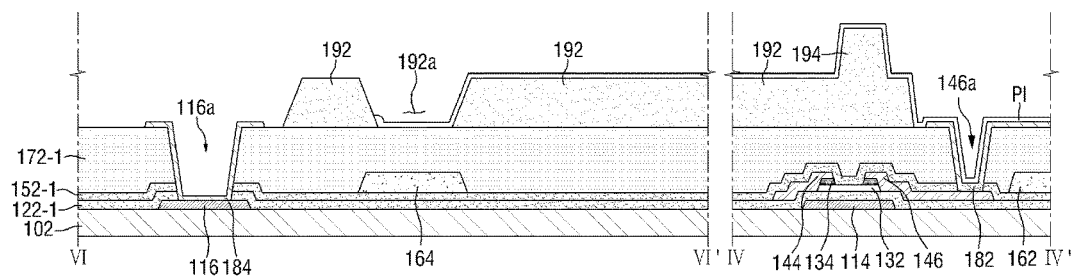
Figure 26:
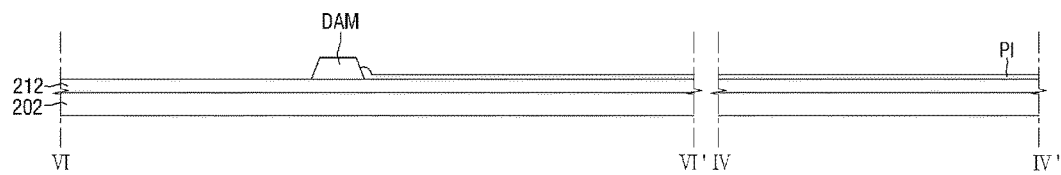

Then, referring to FIGS. 25 and 26, the alignment layer PI is disposed on each of one surface of the first substrate 102 and one surface of the second substrate 202. In an exemplary embodiment, the alignment layer PI may include resinous polymer such as polyimide, polyamic acid, polyamide, polyamic imide, polyester, polyethylene, polyurethane or polystyrene, or a combination thereof. Further, the alignment layer PI may be implemented to include a monomer of the above-mentioned resinous polymer.

The alignment layer PI may be prevented from flowing to the short point by the open portion 192a provided in the light shielding pattern 192 of the first display substrate 100. The alignment layer PI may be prevented from flowing to the short point by the dam structure DAM structure of the second display substrate 200.

Figure 27:
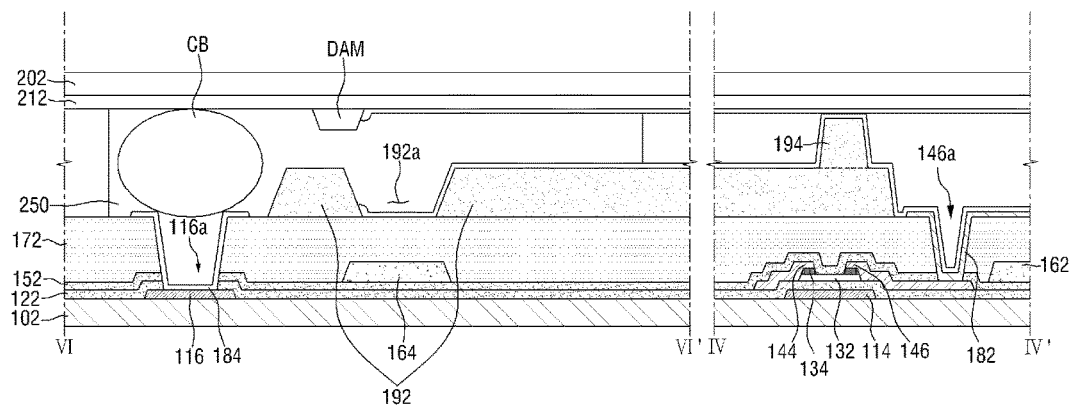

Then, referring to FIG. 27, the liquid crystal layer 300 is provided by coating the liquid crystal molecules having positive or negative dielectric anisotropy on the first substrate 102. Then, the first substrate 100 on which the liquid crystal layer 300 is disposed is coupled with the second display substrate 200.

In concluding the detailed description, those skilled in the art will appreciate that many variations and modifications can be made to the preferred exemplary embodiments without substantially departing from the principles of the invention. Therefore, the disclosed preferred exemplary embodiments of the invention are used in a generic and descriptive sense only and not for purposes of limitation.

What is claimed is:

1. A liquid crystal display device comprising:
a first substrate and a second substrate facing each other;
a liquid crystal layer disposed between the first substrate and the second substrate;
a light shielding pattern disposed on the first substrate; and
an alignment layer disposed on one surface of the first substrate facing the liquid crystal layer, wherein a portion of the alignment layer is disposed in the open portion,
wherein the light shielding pattern includes an open portion defined in a non-display area, and the open portion is defined in the light shielding pattern.

2. A liquid crystal display device comprising:
a first substrate and a second substrate facing each other;
a liquid crystal layer disposed between the first substrate and the second substrate; and
a light shielding pattern disposed on the first substrate;
an alignment layer disposed on one surface of the first substrate facing the liquid crystal layer;
a sealing member disposed on the non-display area and bonds the first substrate with the second substrate;
a common electrode disposed on the second substrate; and
a common voltage line disposed on the non-display area on the first substrate,
wherein
the alignment layer contacts the sealing member,
wherein the light shielding pattern includes an open portion defined in a non-display area, and the open portion is defined in the light shielding pattern, and
wherein the open portion is disposed more inward on the first substrate than a short point at which the common electrode and the common voltage line are electrically connected to each other.

3. The liquid crystal display device of claim 1, further comprising a light shielding colored layer disposed on the first substrate below the light shielding pattern,
wherein the light shielding colored layer corresponds to the open portion.

4. The liquid crystal display device of claim 3, wherein the light shielding colored layer is blue.

5. The liquid crystal display device of claim 3, wherein the light shielding colored layer includes a first light shielding colored layer and a second light shielding colored layer which are stacked sequentially, and the first light shielding colored layer and the second light shielding colored layer have different colors from each other.

6. The liquid crystal display device of claim 5, wherein one of the first light shielding colored layer and the second light shielding colored layer is blue and the other one is red.

7. The liquid crystal display device of claim 1, further comprising an organic layer disposed on the first substrate below the light shielding pattern,
wherein the organic layer includes a stepped portion corresponding to the open portion.

8. The liquid crystal display device of claim 7, further comprising an alignment layer disposed on one surface of the first substrate facing the liquid crystal layer,
wherein a portion of the alignment layer is disposed in the stepped portion.

9. The liquid crystal display device of claim 1, further comprising a light shielding metal layer disposed on the first substrate below the light shielding pattern,
wherein the light shielding metal layer corresponds to the open portion.

10. The liquid crystal display device of claim 1, further comprising a column spacer disposed on the first substrate to maintain a distance between the first substrate and the second substrate,
wherein the light shielding pattern and the column spacer are unitary with each other.

11. A method of manufacturing a liquid crystal display device, the method comprising:
forming a light shielding pattern on a first substrate including a display area and a non-display area; and
forming an alignment layer on the light shielding pattern, wherein
an open portion is defined in the light shielding pattern in the non-display area, and
a portion of the alignment layer is disposed in the open portion.

12. The method of claim 11, further comprising forming a light shielding colored layer on the first substrate below the light shielding pattern, wherein the light shielding colored layer corresponds to the open portion.

13. The method of claim 12, wherein the light shielding colored layer includes a first light shielding colored layer and a second light shielding colored layer which are stacked sequentially, and the first light shielding colored layer and the second light shielding colored layer have different colors from each other.

14. The method of claim 11, further comprising forming an organic layer on the first substrate below the light shielding pattern, wherein the organic layer includes a stepped portion corresponding to the open portion.

15. The method of claim 14, wherein a portion of the alignment layer is disposed in the stepped portion.

16. The method of claim 11, further comprising forming a light shielding metal layer on the first substrate below the light shielding pattern, wherein the light shielding metal layer corresponds to the open portion.

17. The method of claim 11, further comprising forming a column spacer on the first substrate to maintain a distance between the first substrate and the second substrate, wherein the light shielding pattern and the column spacer are simultaneously and unitarily formed.

* * * * *